US011193071B2

(12) United States Patent
Soliman (10) Patent No.: US 11,193,071 B2
(45) Date of Patent: Dec. 7, 2021

(54) SIMULTANEOUS CRUDE OIL DEHYDRATION, DESALTING, SWEETENING, AND STABILIZATION

(71) Applicant: SAUDI ARABIAN OIL COMPANY, Dhahran (SA)

(72) Inventor: Mohamed Soliman, Ras Tanura (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 16/943,718

(22) Filed: Jul. 30, 2020

(65) Prior Publication Data

US 2020/0354640 A1    Nov. 12, 2020

Related U.S. Application Data

(62) Division of application No. 16/291,814, filed on Mar. 4, 2019, now Pat. No. 10,767,121, which is a division of application No. 15/399,591, filed on Jan. 5, 2017, now Pat. No. 10,260,010.

(51) Int. Cl.

| *C10G 31/06* | (2006.01) |
| *C10G 31/08* | (2006.01) |
| *C10G 33/02* | (2006.01) |
| *B01D 17/06* | (2006.01) |
| *C10G 53/02* | (2006.01) |
| *C10G 7/06*  | (2006.01) |
| *B01D 17/04* | (2006.01) |
| *B03C 11/00* | (2006.01) |
| *B01D 19/00* | (2006.01) |
| *B01D 17/02* | (2006.01) |

(52) U.S. Cl.
CPC ......... *C10G 53/02* (2013.01); *B01D 17/0214* (2013.01); *B01D 17/045* (2013.01); *B01D 17/06* (2013.01); *B01D 19/0005* (2013.01); *B01D 19/0068* (2013.01); *B03C 11/00* (2013.01); *C10G 7/06* (2013.01); *C10G 31/06* (2013.01); *C10G 31/08* (2013.01); *C10G 33/02* (2013.01); *C10G 2300/207* (2013.01); *C10G 2300/30* (2013.01)

(58) Field of Classification Search
CPC ........ C10G 31/06; C10G 31/08; C10G 33/02; B01D 17/0214; B01D 17/045; B01D 17/06

See application file for complete search history.

(56) References Cited

U.S. PATENT DOCUMENTS

| 1,247,500 A | 11/1917 | Bulmer |
| 2,327,534 A | 8/1943 | Lambert |
| 2,952,616 A | 9/1960 | Hausch |
| 3,951,771 A * | 4/1976 | Burger ................... B01D 12/00 |
| | | 204/561 |
| 4,180,457 A | 12/1979 | Fotescu |
| 4,308,131 A | 12/1981 | Bannon |
| 4,673,488 A | 6/1987 | Turner |
| 4,824,445 A | 4/1989 | Minkkinen |
| 4,919,777 A | 4/1990 | Bull |
| 5,030,339 A | 7/1991 | Czarnecki |
| 5,464,522 A | 11/1995 | Edmondson |
| 6,045,659 A | 4/2000 | Bjoerkhaug |
| 6,729,145 B1 | 5/2004 | Overaa |
| 6,860,979 B2 | 3/2005 | Sams |
| 7,223,895 B2 | 5/2007 | Sumner |
| 7,568,363 B2 | 8/2009 | Runbalk |
| 7,749,459 B2 | 7/2010 | Nilsen |
| 7,982,086 B2 | 7/2011 | Almering |
| 8,591,714 B2 | 11/2013 | Sams |
| 8,790,509 B2 | 7/2014 | Vu |
| 9,039,884 B2 | 5/2015 | Bjorklund |
| 2005/0006086 A1 | 1/2005 | Gramme |
| 2007/0267325 A1 | 11/2007 | Vu |
| 2008/0251421 A1 | 10/2008 | Liverud |
| 2011/0120913 A1 | 5/2011 | Snawerdt |
| 2012/0253705 A1 | 10/2012 | Chen |
| 2013/0026082 A1 | 1/2013 | Al-Shafei et al. |
| 2014/0001097 A1 | 1/2014 | Jothy |
| 2016/0193612 A1 | 7/2016 | Akdim |

FOREIGN PATENT DOCUMENTS

EP    2497556 A1    9/2012

OTHER PUBLICATIONS

The International Search Report and Written Opinion for related PCT application PCT/US2018/012499 (SA5587) dated Mar. 23, 2018.
Bianco; "Development Phase of Hydrocarbon Fields" Chapter 5.3 "Treatment plants for oil production"; vol. 1, Exploration, Production and Transport; pp. 643-679, (2005).
Devold, Havard, "Oil and gas production handbook," 2006, 162 pages.

* cited by examiner

*Primary Examiner* — Randy Boyer
(74) *Attorney, Agent, or Firm* — Bracewell LLP; Constance G. Rhebergen; Kevin R. Tamm (57) ABSTRACT

Integrated gas oil separation plant systems and methods are disclosed. Systems and methods include treating a crude oil inlet feed stream with a high pressure production trap (HPPT), a low pressure production trap (LPPT), a low pressure degassing tank (LPDT), a first heat exchanger, a second heat exchanger, a LPPT recycle water stream, a fresh wash water supply stream, and a LPDT recycle water stream, where the LPDT recycle water stream is operable to supply recycle water from the LPDT to an output stream from the HPPT to form the LPPT inlet feed stream.

9 Claims, 6 Drawing Sheets

SIMULTANEOUS CRUDE OIL DEHYDRATION, DESALTING, SWEETENING, AND STABILIZATION

PRIORITY

This present application is a divisional application of and claims priority to and the benefit of U.S. patent application Ser. No. 16/291,814, filed Mar. 4, 2019, which itself is divisional application of U.S. patent application Ser. No. 15/399,591, filed Jan. 5, 2017 and issued as U.S. Pat. No. 10,260,010 on Apr. 16, 2019, the entire disclosures of which are incorporated here by reference.

BACKGROUND

Field

The present disclosure relates to gas oil separation plant (GOSP) technology. In particular, the disclosure relates to integrating crude oil desalting, dehydration, sweetening, and stabilization processes to create efficient GOSP systems and processes.

Description of Related Art

In general, a GOSP is a continuous separation process used to refine crude oil that includes a high pressure production trap (HPPT), a low pressure production trap (LPPT), a low pressure degassing tank (LPDT), a dehydrator unit, first and second stage desalting units, a water/oil separation plant (WOSEP), a stabilizer column, centrifugal pumps, heat exchangers, and reboilers. In a GOSP, the pressure is often reduced in several stages to allow the controlled separation of volatile components, such as entrained vapors. Goals of a GOSP include achieving maximum liquid recovery with stabilized oil separated from gas, and water separated from gases and oil. In other words, one purpose of a GOSP is to remove water, salt, and volatile hydrocarbon gases from wet crude oil after it is obtained from a hydrocarbon-bearing reservoir.

Figure 1:
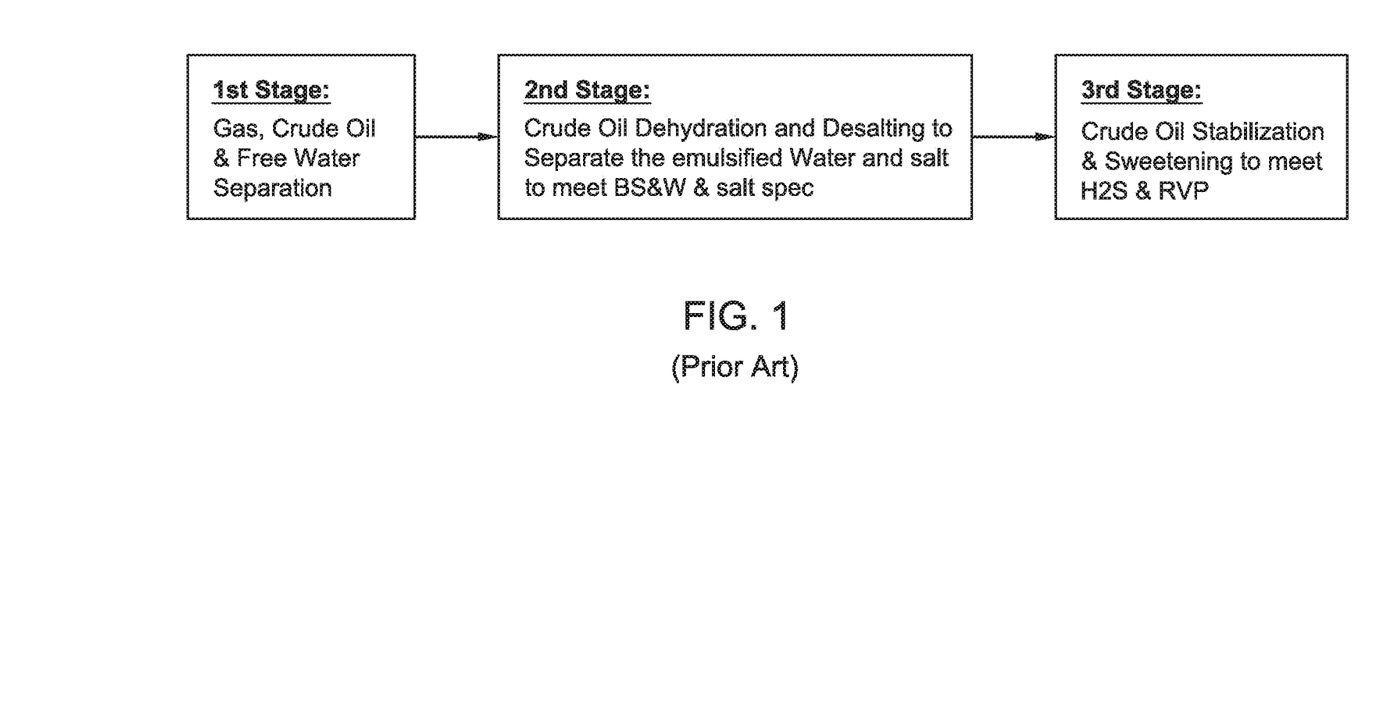
FIG. 1 is a flow chart showing three stages in a conventional GOSP system and process for processing crude oil from production wells in a hydrocarbon-bearing formation.
Figure 2:
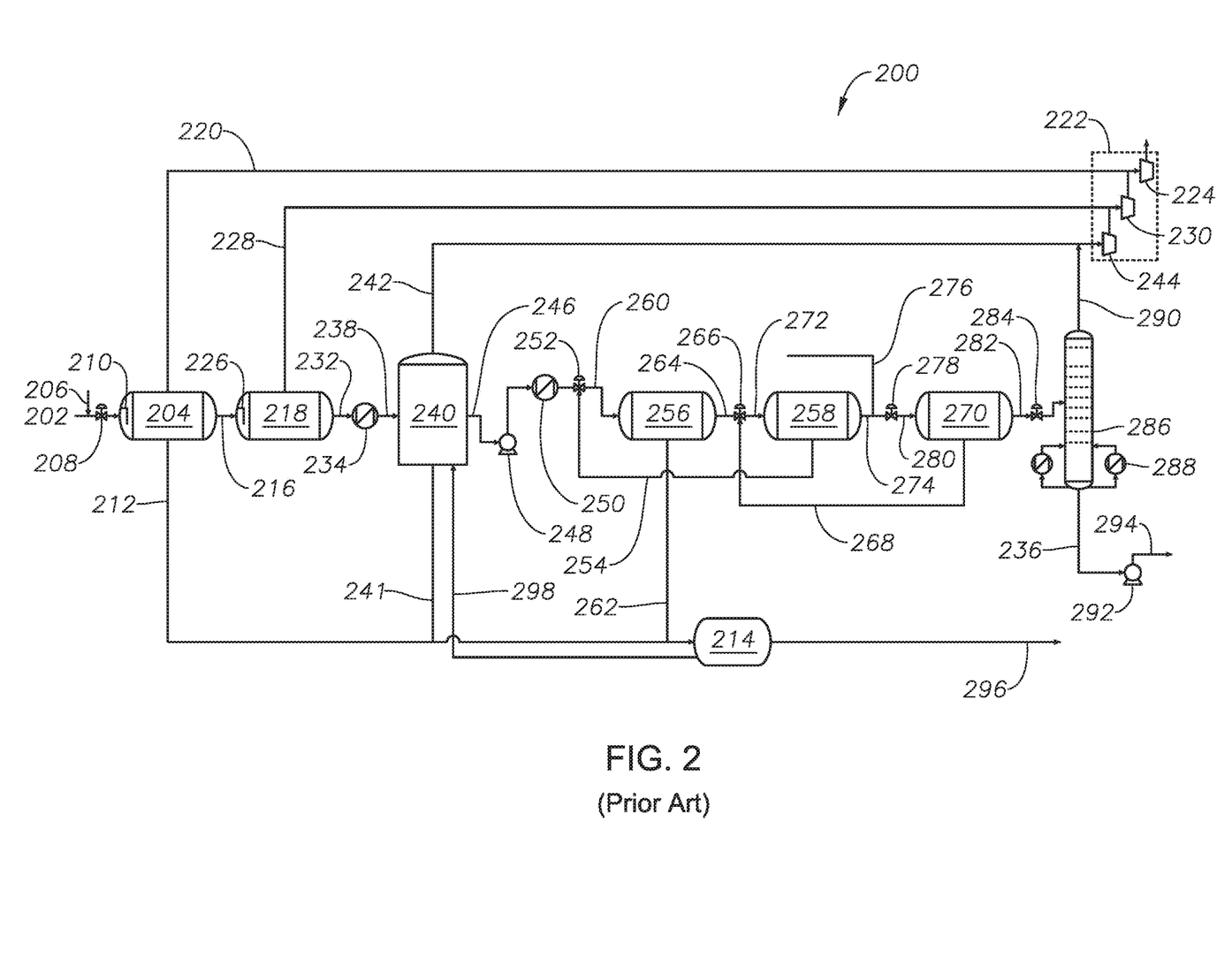
FIG. 2 is a schematic diagram showing a conventional GOSP system and process.

However, a large pressure reduction in a single separator will cause flash vaporization, leading to instability and safety hazards. Thus, in prior art GOSP's, many stages and units are required. FIG. 1 shows three stages in prior art GOSP systems and processes. In a first stage, gas, crude oil, and free water are separated. In a second stage, crude oil is dehydrated and desalted to separate emulsified water and salt to meet certain basic sediment and water (BSW) specifications. In a third stage, crude oil is stabilized and sweetened to meet hydrogen sulfide ($H_2S$) and Reid Vapor Pressure (RVP) specifications.

GOSP's are oftentimes operated to meet the following specifications: (1) a salt concentration of not more than about 10 pound (lbs.) of salt/1000 barrels (PTB); (2) BSW content of not more than about 0.3 volume percent (V %); (3) $H_2S$ content (concentration) of less than about 60 ppm in either the crude stabilization tower (or degassing vessels in the case of sweet crude); and (4) a maximum RVP of about 7 pounds per square inch absolute (psia) and a maximum true vapor pressure (TVP) of about 13.5 psia at 130 degrees Fahrenheit (° F.). Certain characteristics of conventional GOSP systems and processes are described further with regard to FIG. 2.

SUMMARY

The present disclosure describes integrated GOSP systems and processes that meet crude oil export specifications and use less processing units than prior art GOSP's. By integrating and simultaneously applying desalting, dehydration, sweetening, and stabilization processes within certain pre-existing gas/oil separation vessels, advantageously and unexpectedly efficient processes and systems are obtained. Systems and methods of the present disclosure can achieve crude oil export specifications including: (1) a salt concentration of not more than about 10 PTB; (2) BSW content of not more than about 0.3 V %; (3) $H_2S$ content of less than about 60 ppm in either the crude stabilization tower (or degassing vessels in the case of sweet crude); and (4) a maximum RVP of about 7 psia and a maximum TVP of about 13.5 psia at 130° F.

Embodiments of systems and methods of the disclosure provide the ability to separate and stabilize crude oils with "tight" emulsions and increased water cuts that existing GOSP systems and methods cannot separate and stabilize. In other words, conventional desalters can treat crude oils with a water cut between about 30% and about 35%. However, embodiments of the present disclosure efficiently treat crude oils to remove water when the water cut is greater than about 35%. Tight emulsion crude oil normally occurs in medium to heavy crude oils with American Petroleum Institute ("API") numbers less than about 29. Oil specific gravity in the API is typically used as a measure of oil quality. A higher API value indicates a lighter oil and, thus, a higher market value.

Water cut in oil production refers to the total volume of water in the crude oil stream divided by the total volume of crude oil and water. In other words, water cut percent is equal to the total volumetric flowrate of water divided by the volumetric flowrate of water and oil multiplied by 100. Water cut generally increases with the age of an oil well. For example, water cut at the beginning of the life of a well is around zero percent, but as the well ages, water cut can reach close to 100%.

In certain embodiments, systems and methods are provided to treat wet and sour, unstabilized crude oil to meet shipping and transport specifications by simultaneously dehydrating, desalting, stabilizing, and sweetening the crude oil. In some embodiments, three conventional stages of processing crude oil will be done in only one stage. In some embodiments, crude oil desalting, dehydration, sweetening, and stabilization will be integrated within existing three phase separation vessels within a GOSP. Dehydrating crude oil involves the separation of formation water, while desalting includes washing the crude with fresh water in addition to or alternative to recycle water to meet the required salt content and BSW. Recycled water is used in disclosed systems and methods to reduce the amount of fresh wash water required.

Crude sweetening involves the removal of dissolved $H_2S$ from crude oil to meet specifications in a range of about 10-60 ppmw, while crude stabilization involves the removal of light ends from crude oil, mainly $C_1$-$C_4$ hydrocarbons to reduce the TVP to less than about 13 psia at 130° F. below atmospheric pressure, or in other words no vapor will flash under atmospheric conditions, making it safe for transportation and shipment. Stabilizing the crude can be achieved if crude is heated in multiple stages of separation drums working at increasing temperatures and reduced pressure.

Therefore, disclosed herein is an integrated gas oil separation plant system, where the system includes: a crude oil inlet feed stream; a high pressure production trap (HPPT), where the HPPT is fluidly coupled to the crude oil inlet feed stream, and where the HPPT comprises an inlet mixing device operable to thoroughly mix the crude oil inlet feed stream with an additional fluid, a plurality of insulated electrostatic electrodes, and a weir; a low pressure production trap (LPPT), where the LPPT is fluidly coupled to the HPPT, and where the LPPT comprises an inlet mixing device operable to thoroughly mix an LPPT inlet feed stream, a plurality of insulated electrostatic electrodes, and a weir; a low pressure degassing tank (LPDT), where the LPDT is fluidly coupled to the LPPT, and where the LPDT comprises an inlet mixing device operable to thoroughly mix an LPDT inlet feed stream, a plurality of insulated electrostatic electrodes, and a weir; a first heat exchanger, where the first heat exchanger is fluidly disposed between the HPPT and LPPT and is fluidly coupled to both the HPPT and LPPT, and where the first heat exchanger is operable to heat the LPPT inlet feed stream; a second heat exchanger, where the second heat exchanger is fluidly disposed between the LPPT and the LPDT and is fluidly coupled to both the LPPT and LPDT, and where the second heat exchanger is operable to heat the LPDT inlet feed stream; a LPPT recycle water stream, where the LPPT recycle water stream is operable to supply recycle water from the LPPT to be mixed with the crude oil inlet feed stream; a fresh wash water supply stream, where the fresh wash water supply stream is operable to supply fresh water to an output stream of the LPPT to form the LPDT inlet feed stream; and a LPDT recycle water stream, where the LPDT recycle water stream is operable to supply recycle water from the LPDT to an output stream from the HPPT to form the LPPT inlet feed stream.

In some embodiments, the system further comprises a stripping gas stream inlet fluidly coupled with the LPDT, the stripping gas stream inlet operable to supply steam, in addition to or alternative to a low concentration $H_2S$ stripping gas, to the LPDT. In other embodiments, the system further comprises a gas compression plant, where the gas compression plant comprises a high pressure compressor operable to process high pressure off-gas from the HPPT, a low pressure compressor operable to process low pressure off-gas from the LPPT, and an atmospheric pressure compressor operable to process atmospheric-pressure off-gas from the LPDT. In certain embodiments, the system includes an oil/water separator device operable to accept an oily water output stream from the HPPT, operable to separate oil from water, and operable to recycle oil to the LPDT.

In other embodiments, the system further comprises at least one mixing valve preceding the HPPT, at least one mixing valve preceding the first heat exchanger, and at least one mixing valve preceding the second heat exchanger, where the mixing valves are operable to mix crude oil and water. Still in other embodiments, the system is operable to refine crude oil in the crude oil inlet feed stream to produce a refined crude oil product safe for storage and shipment meeting the following specifications: (1) a salt concentration of not more than about 10 pound (lbs.) of salt/1000 barrels (PTB); (2) basic sediment and water (BSW) of not more than about 0.3 volume percent (V %); (3) $H_2S$ concentration of less than about 60 ppm; and (4) a maximum RVP of about 7 pounds per square inch absolute (psia) and a maximum true vapor pressure (TVP) of about 13.5 psia at 130 degrees Fahrenheit (° F.).

In certain embodiments, the system includes an inline gas separator and a second stripping gas stream, the inline gas separator and the second stripping gas stream fluidly disposed between the second heat exchanger and the LPDT and fluidly coupled with the LPDT inlet feed stream, where the inline gas separator is operable to remove atmospheric off-gas to be processed in the gas compression plant, and where the second stripping gas stream is operable to reduce the $H_2S$ content of the LPDT inlet feed stream.

Still in further embodiments, the system includes a supplementary separator device fluidly coupled to an output stream of the LPDT, the supplementary separator device fluidly coupled to a third stripping gas stream, and the supplementary separator device operable to allow the third stripping gas stream to further reduce $H_2S$ content in the output stream of the LPDT. In certain embodiments, the system includes a cold stabilizer, where the cold stabilizer is fluidly coupled to a second stripping gas stream, the second stripping gas stream operable to reduce $H_2S$ content of crude oil in the cold stabilizer, and where the cold stabilizer is operable to remove volatile hydrocarbons from crude oil to produce a stable, non-volatile finalized crude oil product suitable for storage and shipping. In some embodiments, the cold stabilizer has about 16 actual stages.

Still in other embodiments, the system includes a third heat exchanger fluidly coupled to the crude oil inlet feed stream and the HPPT, where the third heat exchanger provides heat to the crude oil inlet feed stream, and at least a portion of the heat arises from a finished crude oil product stream. In some other embodiments, the system includes an inline gas separator fluidly disposed between and fluidly coupled to the at least one mixing valve preceding the HPPT and the third heat exchanger, the inline gas separator operable to separate crude oil from high pressure off-gas, where the gas compression plant is operable to process high-pressure off-gas from the inline gas separator. In certain embodiments, the system includes a second inline gas separator fluidly disposed between and coupled to the second heat exchanger and the LPDT, the second inline gas separator operable to remove atmospheric off-gas from the LPDT inlet feed stream for processing in the gas compression plant.

Still in other embodiments, the system includes a second stripping gas stream fluidly coupled to the LPDT inlet feed stream, a supplementary separator device fluidly coupled to an output stream of the LPDT, the supplementary separator device fluidly coupled to a third stripping gas stream, and the supplementary separator device operable to allow the third stripping gas stream to further reduce $H_2S$ content in the output stream of the LPDT. In certain embodiments, the HPPT is operable to remove about 98% of emulsified water present in crude oil from the crude oil inlet feed stream. In other embodiments, operating pressure within the HPPT is greater than the operating pressure within the LPPT, and the operating pressure within the LPPT is greater than the operating pressure in the LPDT.

In some embodiments, the system is operable to dehydrate, desalt, sweeten, and stabilize crude oil to produce crude oil safe for storage and shipment without any dehydrating or desalting units other than the HPPT, LPPT, and LPDT. In some embodiments, at least one inlet mixing device comprises a cyclonic separator.

Additionally disclosed is an integrated gas oil separation plant system, where the system includes: a crude oil inlet feed stream, the crude oil inlet feed stream operable to convey sour and low pressure crude oil for processing in the system; a low pressure production trap (LPPT), where the LPPT is fluidly coupled to the crude oil inlet feed stream, and where the LPPT comprises an inlet mixing device operable to thoroughly mix an LPPT inlet feed stream, a plurality of insulated electrostatic electrodes, a weir; a low pressure degassing tank (LPDT), where the LPDT is fluidly coupled to the LPPT, and where the LPDT comprises an inlet mixing device operable to thoroughly mix an LPDT inlet feed stream, a plurality of insulated electrostatic electrodes, and a weir, and a stripping gas stream inlet fluidly coupled with the LPDT, the stripping gas stream inlet operable to supply steam in addition to or alternative to a low concentration $H_2S$ stripping gas to the LPDT; an inline gas separator, where the inline gas separator is fluidly disposed in between the crude oil inlet feed stream and the LPPT, and is fluidly disposed between the crude oil inlet feed stream and the LPPT; a first heat exchanger, where the first heat exchanger is fluidly disposed between the inline gas separator and the LPPT and is fluidly coupled to both the inline gas separator and the LPPT, and where the first heat exchanger is operable to heat the LPPT inlet feed stream; a second heat exchanger, where the second heat exchanger is fluidly disposed between the LPPT and the LPDT and is fluidly coupled to both the LPPT and LPDT, and where the second heat exchanger is operable to heat the LPDT inlet feed stream; a LPDT recycle water stream, where the LPDT recycle water stream is operable to supply recycle water from the LPDT to the crude oil inlet feed stream to form the LPPT inlet feed stream; a desalter unit fluidly disposed between the LPDT and a cold stabilizer, where the desalter unit is operable to remove salt water from crude oil; a third heat exchanger, where the third heat exchanger fluidly disposed between the LPDT and the desalter unit, where the third heat exchanger is operable to heat a crude oil output stream from the LPDT; and a fresh wash water supply stream, where the fresh wash water supply stream is operable to supply fresh water to the output stream of the LPDT to form a desalter inlet feed stream.

In some embodiments, the system includes a gas compression plant, where the gas compression plant comprises a low pressure compressor operable to process low pressure off-gas from the inline gas separator and LPPT, and an atmospheric pressure compressor operable to process atmospheric-pressure off-gas from the LPDT and cold stabilizer. In some embodiments, the system includes an oil/water separator device operable to accept an oily water output stream from the LPPT, operable to separate oil from water, and operable to recycle oil to the LPDT. In other embodiments, the system includes at least one mixing valve preceding the first heat exchanger, at least one mixing valve preceding the second heat exchanger, and at least one mixing valve preceding the desalter unit, where the mixing valves are operable to mix crude oil and water.

Still in other embodiments, the system is operable to refine low pressure sour crude in the crude oil inlet feed stream to produce a refined crude oil product safe for storage and shipment meeting the following specifications: (1) a salt concentration of not more than about 10 pound (lbs.) of salt/1000 barrels (PTB); (2) basic sediment and water (B SW) of not more than about 0.3 volume percent (V %); (3) $H_2S$ concentration of less than about 60 ppm; and (4) a maximum RVP of about 7 pounds per square inch absolute (psia) and a maximum true vapor pressure (TVP) of about 13.5 psia at 130 degrees Fahrenheit (° F.). In certain embodiments, the system includes a second stripping gas stream fluidly coupled with the cold stabilizer, the second stripping gas stream operable to reduce the concentration of $H_2S$ in crude oil in the cold stabilizer, and the cold stabilizer operable to remove volatile hydrocarbons from crude oil to produce a stable, non-volatile finalized crude oil product suitable for storage and shipping.

In some embodiments, the cold stabilizer has about 16 actual stages. In other embodiments, at least a portion of the heat provided by the first heat exchanger arises from a finished crude oil product stream. Still in other embodiments, the operating pressure within the LPPT is greater than the operating pressure within the LPDT. In certain embodiments, the system is operable to dehydrate, desalt, sweeten, and stabilize crude oil to produce crude oil safe for storage and shipment without any dehydrating or desalting units other than the LPPT, the LPDT, the desalter unit, and the cold stabilizer.

Additionally disclosed is an integrated gas oil separation method, where the method includes the steps of: separating, under high pressure, high pressure off-gas and oily water from crude oil, where separation is aided by electrostatic coalescence; heating the crude oil separated from the oily water and high pressure off-gas; separating, under low pressure, a low pressure off-gas and water from the crude oil, where separation is aided by electrostatic coalescence; recycling water separated, under low pressure, to mix with the crude oil before the step of separating, under high pressure; mixing fresh water with the crude oil; heating the crude oil separated from the water and low pressure off-gas; separating, under atmospheric pressure, an atmospheric pressure off-gas and water from the crude oil, where separation is aided by electrostatic coalescence; recycling water separated, under atmospheric pressure, to mix with the crude oil before the step of separating, under low pressure; and producing a dehydrated, desalted, stable, and sweetened crude oil product safe for storage and transport.

In some embodiments, the method further comprises the step of applying a stripping gas stream to reduce $H_2S$ content of the crude oil, the stripping gas stream comprising gas at a lower $H_2S$ concentration than the crude oil. In other embodiments, the method includes the step of collecting high pressure off-gas, low pressure off-gas, and atmospheric off-gas for treatment and processing. Still in other embodiments, the method includes the steps of separating oil from water in an oily water output stream, and recycling oil from the oily water output stream for further processing. In some embodiments, the method is operable to refine crude oil in the crude oil inlet feed stream to produce a refined crude oil product safe for storage and shipment meeting the following specifications: (1) a salt concentration of not more than about 10 pound (lbs.) of salt/1000 barrels (PTB); (2) basic sediment and water (BSW) of not more than about 0.3 volume percent (V %); (3) $H_2S$ concentration of less than about 60 ppm; and (4) a maximum RVP of about 7 pounds per square inch absolute (psia) and a maximum true vapor pressure (TVP) of about 13.5 psia at 130 degrees Fahrenheit (° F.).

Still in other embodiments, the method includes the step of applying a second stripping gas stream to reduce the $H_2S$ content of the crude oil, the second stripping gas stream comprising gas at a lower $H_2S$ concentration than the crude oil. In yet other embodiments, the method comprises the steps of sweetening the crude oil and stabilizing the crude oil to reduce $H_2S$ content of the crude oil, and to remove volatile hydrocarbons from the crude oil to produce a stable, non-volatile finalized crude oil product suitable for storage and shipping.

Still in other embodiments, the method includes the step of heating the crude oil before the step of separating, under high pressure, high pressure off-gas and oily water from crude oil, where separation is aided by electrostatic coalescence. Still in other embodiments, the step of separating, under high pressure, high pressure off-gas and oily water from crude oil, where separation is aided by electrostatic coalescence, is operable to remove about 98% of emulsified water present in the crude oil. In certain embodiments of the method, the method is operable to dehydrate, desalt, sweeten, and stabilize crude oil to produce crude oil safe for storage and shipment without any dehydrating or desalting units other than a high pressure production trap, a low pressure production trap, and a low pressure degassing tank.

Additionally disclosed is an integrated gas oil separation method, where the method includes the steps of: heating crude oil, the crude oil comprising sour and low pressure crude oil; separating, under low pressure, a low pressure off-gas and water from the crude oil, where separation is aided by electrostatic coalescence to produce partially dry crude oil; heating the partially dry crude oil separated from the water and low pressure off-gas; separating, under atmospheric pressure, an atmospheric pressure off-gas and water from the partially dry crude oil to produce further partially dry crude oil, where separation is aided by electrostatic coalescence; recycling the water separated, under atmospheric pressure, to mix with the crude oil before the step of separating, under low pressure; heating the further partially dry crude oil; mixing with the further partially dry crude oil fresh wash water; desalting the further partially dry crude oil to produce recycle salt water and desalted, dry crude oil; recycling the recycle salt water to mix with the partially dry crude oil before the step of separating, under atmospheric pressure; stabilizing the desalted, dry crude oil to remove volatile hydrocarbons from the crude oil; sweetening the desalted, dry crude oil to reduce $H_2S$ content in the desalted, dry crude oil; and producing a dehydrated, desalted, stable, and sweetened crude oil product safe for storage and transport.

In some embodiments, the step of sweetening the desalted, dry crude oil comprises applying a stripping gas stream to reduce the $H_2S$ content of the crude oil, the stripping gas stream comprising gas at a lower $H_2S$ concentration than the crude oil. Still in other embodiments, the method further includes the step of collecting low pressure off-gas and atmospheric off-gas for treatment and processing. In yet other embodiments, the method includes the steps of separating oil from water in an oily water output stream, and recycling oil from the oily water output stream for further processing. In some embodiments, the method is operable to refine sour and low pressure crude oil to produce a refined crude oil product safe for storage and shipment meeting the following specifications: (1) a salt concentration of not more than about 10 pound (lbs.) of salt/1000 barrels (PTB); (2) basic sediment and water (B SW) of not more than about 0.3 volume percent (V %); (3) $H_2S$ concentration of less than about 60 ppm; and (4) a maximum RVP of about 7 pounds per square inch absolute (psia) and a maximum true vapor pressure (TVP) of about 13.5 psia at 130 degrees Fahrenheit (° F.).

In some embodiments, the method includes the step of applying a second stripping gas stream to reduce the $H_2S$ content of the crude oil, the second stripping gas stream comprising gas at a lower $H_2S$ concentration than the crude oil. In other embodiments, the step of separating, under low pressure, low pressure off-gas and water from crude oil, where separation is aided by electrostatic coalescence, is operable to remove about 98% of emulsified water present in the crude oil from. In some embodiments of the method, the method is operable to dehydrate, desalt, sweeten, and stabilize crude oil to produce crude oil safe for storage and shipment without any dehydrating or desalting units other than a low pressure production trap, a low pressure degassing tank, a desalter unit, and a cold stabilizer. In some embodiments, at least a portion of the heat provided for heating crude oil arises from the dehydrated, desalted, stable, and sweetened crude oil product.

BRIEF DESCRIPTION OF THE DRAWINGS

These and other features, aspects, and advantages of the disclosure will become better understood with regard to the following descriptions, claims, and accompanying drawings. It is to be noted, however, that the drawings illustrate only several embodiments of the disclosure and are therefore not to be considered limiting of the disclosure's scope as it can admit to other equally effective embodiments.

DETAILED DESCRIPTION

While the disclosure will be described in connection with several embodiments, it will be understood that it is not intended to limit the disclosure to those embodiments. On the contrary, it is intended to cover all the alternatives, modifications, and equivalents as may be included within the spirit and scope of the disclosure defined by the appended claims.

Referring first to FIG. 1, a flow chart is provided showing three stages in a conventional GOSP system and process for processing crude oil from production wells in a hydrocarbon-bearing formation. In a first stage, gas, crude oil, and free water are separated. In a second stage, crude oil is dehydrated and desalted to separate emulsified water and salt to meet certain basic sediment and water (BSW) specifications. In a third stage, crude oil is stabilized and sweetened to meet hydrogen sulfide ($H_2S$) and Reid Vapor Pressure (RVP) specifications. Generally, sour crude oil refers to any crude oil with a total sulfur level of more than about 0.5% by weight. In upstream operations, as described herein, the phrase sour crude also refers to any crude oil with an $H_2S$ content higher than about 60 ppm by weight, and sweet crude oil refers to any crude oil that has an $H_2S$ content of less than about 60 ppm by weight.

FIG. 2 is a schematic diagram showing a conventional GOSP system and process. In conventional GOSP system and process 200, a wet crude oil inlet stream 202 from oil production wells (not shown) enters the high pressure production trap unit (HPPT) 204 and undergoes an initial three-phase separation to remove most of the gases and free-formation water from wet crude oil. A pressure drop in HPPT 204 causes lighter hydrocarbon gases in the crude oil to separate from the heavier liquid hydrocarbons. Operating conditions in the HPPT include temperature in a range from about 65° F. to about 130° F., and pressure at about 150 pounds per square inch gauge (psig). GOSP system and process 200 also includes a demulsifier injection port 206, a slug valve 208, and an inlet diverter 210.

Wet crude oil as used in the specification generally refers to crude oil having more than about 0.3 volume percent of water, while dry crude oil has less than about 0.3 volume percent of water. The phrase lighter hydrocarbons as used throughout the specification refers generally to $C_{1-4}$ components such as, for example, methane, ethane, propane, butane, iso-butane, and trace amounts of $C_{5+}$ compounds. The phrase heavier hydrocarbons as used in the specification refers generally to $C_{5+}$ or five-carbon and greater hydrocarbons such as, for example, pentane, is-pentane, hexane, and heptane. Heavier hydrocarbons can have trace amounts of lighter hydrocarbons.

An oily water discharge stream 212 is discharged from HPPT 204 for collection in an oil/water separator vessel 214. HPPT crude oil outlet stream 216 still contains a certain amount of water and gas, and proceeds to the next stage in conventional GOSP system and process 200, which is the low pressure production trap (LPPT) 218. An HPPT high pressure gas outlet stream 220 proceeds to a gas compression plant 222, which includes a high pressure compressor 224 for processing high pressure gas. HPPT high pressure gas outlet stream 220, in some embodiments, ranges from between about 150 psig to about 450 psig, depending on the crude oil supply pressure. HPPT high pressure gas outlet stream 220 can include lighter hydrocarbons, traces of $C_{5+}$ hydrocarbons, $H_2S$, $CO_2$, $N_2$, and water vapor; however, the relative amounts and types of compounds will depend on the crude oil inlet feed stream.

LPPT 218 removes certain remaining off-gases in HPPT crude oil outlet stream 216. LPPT 218 further includes an inlet diverter 226. LPPT 218 is a horizontal two-phase separation vessel, which separates certain remaining off-gases from the wet crude oil. LPPT 218 operates at a lower pressure than HPPT 204. Outlets from LPPT 218 include LPPT low pressure off-gas stream 228, which proceeds to gas compression plant 222 and a low pressure compressor 230, and LPPT wet crude oil outlet stream 232, which proceeds to downstream processing. Operating conditions in LPPT 218 include temperature in a range from about 65° F. to about 130° F. and a pressure at about 50 psig.

LPPT low pressure off-gas stream 228 ranges from between about 50 psig to about 90 psig. LPPT low pressure off-gas stream 228 can include lighter hydrocarbons, traces of $C_{5+}$ hydrocarbons, $H_2S$, $CO_2$, $N_2$, and water vapor; however, the relative amounts and types of compounds will depend on the crude oil inlet feed stream.

LPPT wet crude oil outlet stream 232 proceeds to a first heat exchanger 234 where it can recover heat from a crude oil stabilizer product bottom stream 236, thus reheating any oil, water, and gas in LPPT wet crude oil outlet stream 232. Heating wet crude allows for easier separation of water from crude oil as water cut increases and temperature of crude oil from a well or pipeline decreases. Heating of crude oil helps to improve oil/water separation, and improves desalting and dehydrating efficiency by reducing emulsion viscosity and stabilizing crude oil. In other words, heating allows for the coalescence of water droplets and their settling out in the liquid phase, and encourages degassing of crude oil in order to stabilize the crude oil.

Heated crude oil outlet stream 238 from first heat exchanger 234 proceeds to a three-phase separator low pressure degassing tank (LPDT) 240, in which pressure is reduced to about 3 psig, so that any remaining heavy gas components can boil off. Heavy gas components in the case of LPDT 240 can include propane, butane, iso-butane, $H_2S$, $CO_2$, and $C_{5+}$ hydrocarbons; however, the relative amounts and types of compounds will depend on the crude oil inlet feed stream. Operating conditions in LPDT 240 include a temperature in a range from about 65° F. to about 130° F. and a pressure between about 3 psig to about 5 psig. Atmospheric gas stream 242 proceeds from LPDT 240 to gas compression plant 222 and atmospheric compressor 244. Oily water proceeds by stream 241 to oil/water separator vessel 214.

LPDT crude oil outlet stream 246 is pumped through crude oil charge pumps 248 and proceeds to a trim heat exchanger 250 to increase the temperature of LPDT crude oil outlet stream 246. LPDT crude oil outlet stream 246 then proceeds through a mixing valve 252, in which LPDT crude oil outlet stream 246 is mixed with a recycled wash water stream 254 before proceeding to a dehydrator unit 256 for further oil/water separation. Heating LPDT crude oil outlet stream 246 with trim heat exchanger 250 enhances dehydrating and desalting efficiency, for example in dehydrator unit 256. Heat exchangers can be of a tube/shell type, in which wet crude oil passes though the inner tubes and the heating medium is placed within an outer shell surrounding the tubes.

Recycled wash water stream 254 is mixed with LPDT crude oil outlet stream 246 in a mixing valve 252 once LPDT crude oil outlet stream 246 is heated by trim heat exchanger 250. Recycled wash water stream 254 originates from a first stage desalter 258 before entering dehydrator unit 256. Dehydrator unit 256 is a horizontal vessel in which a first stage of drying wet crude oil takes place. Washing and electrostatic coalescence takes places in dehydrator unit 256. Wet crude oil input 260 to dehydrator unit 256 contains some free salt water, and some salt water in the form of an emulsion. The emulsion is separated into layers of oil and water by electrostatic coalescence in dehydrator unit 256.

Electrostatic coalescence uses an electric current and causes water droplets in an emulsion to collide, coalesce into larger (heavier) drops, and settle out of the suspending phase, such as crude oil. This process partially dries wet crude oil. Oily water proceeds by oily water outlet stream 262 to oil/water separator vessel 214. A dehydrator unit outlet stream 264, still containing some salty water in emulsion, proceeds to first stage desalter 258 through a mixing valve 266. The operating conditions of dehydrator unit 256 include a temperature in the range of from about 130° F. to about 160° F. and a pressure at about 25 psig above the crude oil vapor pressure. In mixing valve 266, dehydrator unit outlet stream 264 is mixed with recycled water stream 268 from a second stage desalter 270.

A partially dried crude oil inlet stream 272 enters first stage desalter 258 after dehydrator unit 256. As noted, at mixing valve 266, dehydrator unit outlet stream 264 is mixed with recycled water stream 268 from a second stage desalter 270. Effluent water from first stage desalter 258 proceeds to dehydrator unit 256 by recycled wash water stream 254. Operating conditions of the first stage desalter 258 includes a temperature range from about 130° F. to about 160° F. and a pressure at about 25 psig above the crude vapor pressure.

Second stage desalter 270 is the final stage of wet crude oil processing in a conventional GOSP. First stage desalter partially dried crude oil outlet stream 274 proceeds to the second stage desalter 270 from the first stage desalter 258. Fresh wash water stream 276 (low in salt concentration relative to the salt concentration of emulsified water in the crude oil) is injected into an inlet of second stage desalter mixing valve 278 to form second stage desalter inlet stream 280 once combined with first stage desalter partially dried crude oil outlet stream 274. Low salinity wash water rinses substantially all remaining salt from the crude oil. Fresh wash water is used in the desalting process to ensure that the maximum amount of salt is rinsed from wet crude oil. Electrostatic coalescence removes the remaining water emulsion from the wet crude oil in second stage desalter 270 in the same way as dehydrator unit 256 and first stage desalter 258. Effluent water from second stage desalter 270 proceeds to first stage desalter 258 by recycled water stream 268.

Wash water salinity can range from between about 100 ppm to about 12,000 ppm. Wash water is more effective if the salinity level is low. Formation water salinity produced with crude oil can reach as high as about 270,000 ppm of salt.

Second stage desalter outlet stream 282 includes dry, desalted crude oil that passes to a depressurizing valve 284 and then to a crude oil stabilizer 286. Operating conditions of the second stage desalter 270 include a temperature in a range from about 130° F. to about 160° F. and an operating pressure at least about 25 psig above the crude vapor pressure.

Once crude oil is partially degassed, dehydrated, and desalted after second stage desalter 270, there are two more steps to be applied before crude oil is suitable for storage, export, and refining; sweetening and stabilization. Sweetening involves the removal of dissolved $H_2S$ gas from crude oil to meet specifications in a range of about 10-60 ppm $H_2S$. Sweetening is performed to reduce corrosion to pipelines and eliminate health and safety hazards associated with $H_2S$. Steam can be used to strip $H_2S$ gas from crude oil in addition to or alternative to any other suitable stripping gas that is low in $H_2S$ concentration relative to the crude oil. Suitable stripping gas streams include natural gas low in $H_2S$ concentration (such as methane and ethane), steam, and nitrogen ($N_2$).

Stabilization operates by heating unstabilized crude oil containing dissolved gases and $H_2S$, and splitting it into two components: gas from an overhead stream and crude oil from a bottoms stream. Stabilizing crude oil can be achieved if crude oil is heated in multiple stages of separation drums working at increasing temperatures and reduced pressure, such as for example in crude oil stabilizer 286. Oil stabilization units perform two functions at the same time, which include sweetening sour crude oil by removing hydrogen sulfide and reducing vapor pressure, thereby making the crude safe for shipment in pipelines.

Stabilization involves the removal of light ends, mainly $C_1$-$C_4$ hydrocarbons, from crude oil, to reduce the vapor pressure to produce a less volatile and stable product that can be stored in an atmospheric tank. Stabilization also aims to lower vapor pressure of crude oil to at least about 13 psia below atmospheric pressure, so no vapor will flash under atmospheric conditions, making it safe for transportation and shipment. The operating temperature of the crude oil stabilizer 286 ranges from about 160° F. to about 200° F., and the pressure ranges from about 3 to about 5 psig.

Oil from the second stage desalter 270 proceeds to the top of the crude oil stabilizer 286 and is distributed onto a top tray. Crude oil stabilizer 286 has a number of trays (for example, up to about sixteen), whereby crude oil flows down over each tray until it reaches a draw-off tray. A thermosiphon reboiler 288 heats dry crude oil from the draw-off tray and returns it to crude oil stabilizer 286. Light components in the crude oil vaporize and rise through the stabilizer trays. Hydrogen sulfide and light hydrocarbons are removed as an atmospheric gas stream 290, which proceeds to gas compression plant 222 and atmospheric compressor 244.

Crude oil stabilizer product bottom stream 236 proceeds to a crude oil shipping pump 292, and a dry crude product suitable for storage and shipping is provided by dry crude product stream 294. Crude oil stabilizer 286 is used to meet the RVP and $H_2S$ specifications. After stabilization and sweetening, the crude oil should meet all specifications for shipment. These specifications include the following: (1) a salt concentration of not more than about 10 PTB; (2) BSW content of not more than about 0.3 V %; (3) $H_2S$ content of less than about 60 ppm in either the crude stabilization tower (or degassing vessels in the case of sweet crude); and (4) a maximum RVP of about 7 psia and a maximum TVP of about 13.5 psia at 130° F.

Oil/water separator vessel 214 collects water from streams originating from HPPT 204, LPDT 240, and dehydrator unit 256, and separates oil from the collected water. Wastewater is discharged via wastewater stream 296 to disposal water wells and extracted oil is conveyed to the LPDT 240 via recycle stream 298.

Figure 3:
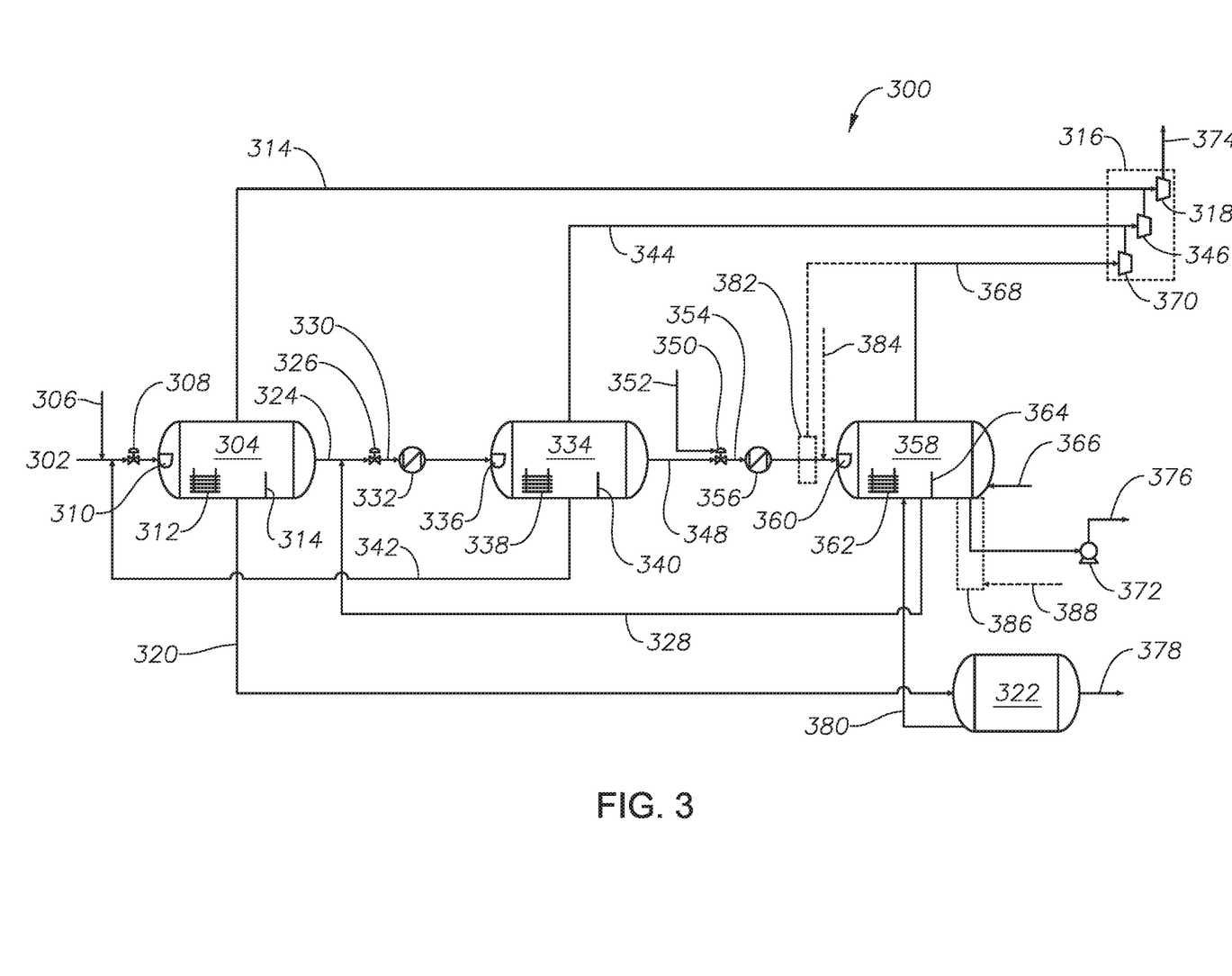
FIG. 3 is a schematic diagram showing an integrated GOSP of the present disclosure used for processing sweet crude oil.

Referring now to FIG. 3, a schematic diagram is provided showing an integrated GOSP of the present disclosure used for processing sweet crude oil. Certain benefits of integrated GOSP system 300 include eliminating a crude oil stabilizer, such as for example crude oil stabilizer 286, eliminating crude stabilizer reboilers, such as for example thermosiphon reboiler 288, eliminating certain crude charge pumps, such as for example crude oil charge pumps 248, eliminating a first stage desalter, such as for example first stage desalter 258, eliminating a second stage desalter, such as for example second stage desalter 270, and eliminating a crude oil dehydrator, such as dehydrator unit 256. Further benefits include integrated GOSP systems and methods being compact, efficient, and easily mobilized, transportable, and deployable in small-scale and offshore applications. Embodiments of the present disclosure reduce the need for units in land-based onshore applications, while also reducing costs of operation.

In integrated GOSP system 300, a sweet crude oil feed inlet 302 feeds sweet, wet, unstabilized crude oil mixed with salt water from production wells of a hydrocarbon-bearing formation to a HPPT 304. Sweet crude oil feed inlet 302 includes a demulsifier injection port 306 and a mixing valve 308, through which sweet crude oil and a demulsifier can flow. Sweet crude oil feed inlet 302 is mixed with recycle water stream 342 from LPPT 334 before entering HPPT 304. Demulsifiers enhance desalting processes and allow treatment of "tight" emulsions. Also referred to as emulsion breakers, demulsifiers are chemicals used to separate emulsions such as, for example, water in oil. For example, one such demulsifier is PHASETREAT® by Clariant of Muttenz, Switzerland.

HPPT 304 includes a high efficiency inlet mixing device 310, insulated electrostatic electrodes 312, and a weir 314. Suitable insulated electrostatic electrodes 312 are commercially available and provide the ability for integrated GOSP system 300 to operate at 100% liquid or 100% gas, and eliminate the need to operate units, such as for example desalters, at 25 psi above the crude vapor pressure, which is required in conventional desalters. Suitable electrostatic electrodes include vessel internal electrostatic coalescers (VIEC's) by Wartsila Corporation of Helsinki, Finland. High pressure gas from HPPT 304 proceeds to a gas compression plant 316 including a high pressure compressor 318. Oily water from HPPT 304 proceeds via oily water stream 320 to oil/water separator unit 322. Weir 314 helps physically separate oil from water within HPPT 304, and helps maintain an appropriate oil level within the vessel.

A pressure drop in HPPT 304 causes lighter hydrocarbon gases in the crude oil to separate from the heavier liquid hydrocarbons. Light hydrocarbons, for example methane and ethane, can be separated in HPPT 304. Insulated electrostatic electrodes 312 will simultaneously dehydrate the crude and substantially remove emulsified water up to about 98%.

HPPT crude oil outlet stream 324 includes partially dried crude oil and proceeds to a mixing valve 326 where partially dried crude oil in HPPT crude oil outlet stream 324 is mixed with recycled water stream 328. Mixed oil and water stream 330 proceeds to a first heat exchanger 332 for heating. First heat exchanger 332 precedes a LPPT 334. Notably, first heat exchanger 332 preceding LPPT 334 is different than that arrangement in FIG. 2, where first heat exchanger 234 precedes LPDT 240 and not LPPT 218. Heating wet crude allows easier separation of gases and enhances dehydration and desalting efficiency.

LPPT 334, a horizontal three-phase separator, further includes a high efficiency inlet mixing device 336, insulated electrostatic electrodes 338 to separate emulsified water, and a weir 340 to aid in physical separation of oil from water. High efficiency inlet mixing devices, such as for example high efficiency inlet mixing device 336, help evenly and thoroughly mix components with the crude oil, such as wash water. A recycle water stream 342 returns water from the bottom of LPPT 334 to sweet crude oil feed inlet 302 for mixing in mixing valve 308. Low pressure gas travels by low pressure gas stream 344 to gas compression plant 316 and a low pressure gas compressor 346. The operating pressure of LPPT 334 is lower than HPPT 304 to allow the removal of gases. The pressure of the LPPT 334 is normally around ⅓ of the pressure of the HPPT 304 to maximize the liquid recovery. The outputs from LPPT 334 are off-gas which proceeds to gas compression plant 316 by low pressure gas stream 344, formation water which is recycled back to HPPT 304 upstream of the mixing valve 308, and partially dried crude oil which proceeds to LPDT 358 for desalting and stabilization.

LPPT crude oil outlet stream 348 proceeds to a mixing valve 350 to be mixed with fresh wash water from wash water stream 352. LPPT crude oil outlet stream 348, comprising dry crude oil from LPPT 334, still contains some light components or impurities that need to be further reduced. These impurities include $H_2S$, $N_2$, $CO_2$, $CH_4$, $C_2H_4$, $C_3H_6$, water, and any other suspended solids or volatile gases. Dry crude is mixed with fresh wash water in a mixing valve, such as mixing valve 350, or any other mixers to disperse the water into small fine droplets to reduce the salt content concentration or any other impurities. Low salinity wash water rinses the remaining salt from the crude oil. The fresh wash water is used in the desalter process to ensure that the maximum amount of salt is rinsed from the wet crude oil. Injecting the low salinity water before a trim heat exchanger 356 will also minimize fouling.

Mixed oil and water stream 354 enters trim heat exchanger 356 to be heated prior to entering LPDT 358. LPDT 358 includes a high efficiency inlet mixing device 360, insulated electrostatic electrodes 362 to separate emulsified water, and a weir 364. Notably, trim heat exchanger 356 precedes LPDT 358, which is different than in the embodiment of FIG. 2, in which trim heat exchanger 250 precedes dehydrator unit 256. Moreover, mixing valve 326 precedes first heat exchanger 332 and LPPT 334 in FIG. 3, and mixing valve 350 precedes trim heat exchanger 356 and LPDT 358 in FIG. 3. This is substantially different than the placement of mixing valves shown in FIG. 2, as in FIG. 2 no mixing valves precede either LPPT 218 or LPDT 240. Electrostatic coalescence in LPDT 358 removes substantially all of the remaining water emulsion from wet crude oil in the same way as the second stage desalters in conventional GOSP's, such as for example second stage desalter 270.

LPDT 358 includes an optional sweet gas stripping stream 366, such as for example steam in addition to or alternative to one or more other gases low in $H_2S$ content relative to the crude oil, to strip or remove the $H_2S$ from crude oil, depending on the crude oil being sweet or sour. LPDT 358 operates at lower pressure than LPPT 334, and the pressure is set to substantially remove all gas impurities necessary for the crude oil to meet RVP and $H_2S$ content requirements. The operating pressure can range from as high as 10 psig to vacuum conditions. Atmospheric gas stream 368 proceeds from LPDT 358 to atmospheric compressor 370 in gas compression plant 316. Compressed gas exits integrated GOSP system 300 by gas exit stream 374. Water from LPDT 358 is recycled via recycled water stream 328 to LPPT 334. Pump 372 pumps dry, desalted, and stabilized crude oil from LPDT 358 by dry, desalted, and stabilized crude oil product line 376. Water obtained from oil/water separator unit 322 exits by water exit stream 378.

In some embodiments, atmospheric pressure off-gas exits an LPDT at between about 14.7 psia and about 25 psia, low pressure off-gas exits an LPPT at about 65 psia, and high pressure off-gas exits an HPPT at about 165 psia and greater.

The composition of high pressure off-gases, low pressure off-gases, and atmospheric pressure off-gases will vary depending on the temperature and pressure of an HPPT, LPPT, and LPDT. Moreover, the composition of high pressure off-gases, low pressure off-gases, and atmospheric pressure off-gases will depend on the inlet temperature, pressure, and composition of crude oil. A low pressure off-gas will have higher molecular weight compounds than a high pressure off-gas, and an atmospheric pressure off-gas will have higher molecular weight compounds than a low pressure off-gas. In some embodiments, a high pressure compressor accepts high pressure off-gas at about 150 psig and compresses the high pressure off-gas to about 450 psig; a low pressure compressor accepts low pressure off-gas at about 50 psig and compresses the low pressure off-gas to about 160 psig; and an atmospheric pressure compressor accepts atmospheric pressure off-gas at about 0.7 psig and compresses the atmospheric pressure off-gas to about 60 psig.

After dehydration, desalting, stabilization, and sweetening (if necessary) the crude oil should meet all of the specifications necessary for shipment, transport, and storage. These specifications include the following: (1) a salt concentration of not more than about 10 PTB; (2) BSW content of not more than about 0.3 V %; (3) $H_2S$ content of less than about 60 ppm in either the crude stabilization tower (or degassing vessels in the case of sweet crude); and (4) a maximum RVP of about 7 psia and a maximum TVP of about 13.5 psia at 130° F.

In some embodiments of operating the system of FIG. 3, the results shown in Table 1 are achieved after crude oil exits LPDT 358.

TABLE 1

Characteristics of Crude Oil Processed by an Embodiment
of the Present Invention versus a Conventional GOSP.

|  | Conventional GOSP | Embodiment of FIG. 3 |
|---|---|---|
| Salt Content | Greater than about 10 PTB | Less than about 10 PTB |
| BS&W | About 1 to about 65 volume percent | Less than about 0.3 volume percent |
| RVP | About 16 psia | Less than about 7.0 psia |
| $H_2S$ Concentration | Greater than about 60 ppm (w/w) | Less than about 60 ppm (w/w) |

In some embodiments of operating the system of FIG. 3, the operating conditions shown in Table 2 are used to process crude oil.

TABLE 2

Operating Conditions in an Embodiment of the Present
Invention versus a Conventional GOSP.

|  | Conventional GOSP | | Embodiment of FIG. 3 | |
|---|---|---|---|---|
|  | Temperature, ° F. | Pressure, psia | Temperature, ° F. | Pressure, psia |
| HPPT Inlet | 95 | 165 | 95 | 165 |
| HPPT Outlet | 95 | 165 | 102 | 165 |
| 1$^{st}$ Heat Exchanger Outlet | NA | NA | 135 | 140 |
| LPPT Outlet | 95 | 60 | 133 | 60 |
| 2$^{nd}$ Heat Exchanger Outlet | 135 | 30 | 170 | 30 |
| LPDT Outlet | 128 | 18 | 158 | 18 |

Oil/water separator unit 322 collects oily water from HPPT 304, LPPT 334, and LPDT 358 via oily water stream 320, and wastewater is discharged to a disposal water well and extracted oil is conveyed to the LPDT 358 via recycle line 380. In some embodiments, inlet mixing devices 310, 336, and 360 include cyclonic separators. Efficient inlet mixing devices and cyclonic separators improve the separation of gas and liquid in vessels such as an HPPT, LPPT, and LPDT, and thus the size of vessels including HPPT's, LPPT's, and LPDT's can be reduced in embodiments of the present invention.

In some embodiments of FIG. 3, systems and methods can be modified, as needed, to treat sweet or sour crude. For example, after trim heat exchanger 356, an optional inline gas separator 382 and optional additional stripping gas stream 384 can be operated depending on the $H_2S$ content of the crude oil and the final specifications required. Atmospheric off gas from optional inline gas separator 382 would exit by atmospheric gas stream 368, and partially sweetened crude oil would pass to LPDT 358 after being mixed with optional additional stripping gas stream 384. Alternatively, additional separation stages in addition to or alternative to one or more additional stripping streams could follow LPDT 358 between LPDT 358 and pump 372, such as, for example, optional separator 386 and optional stripping gas stream 388.

Figure 4:
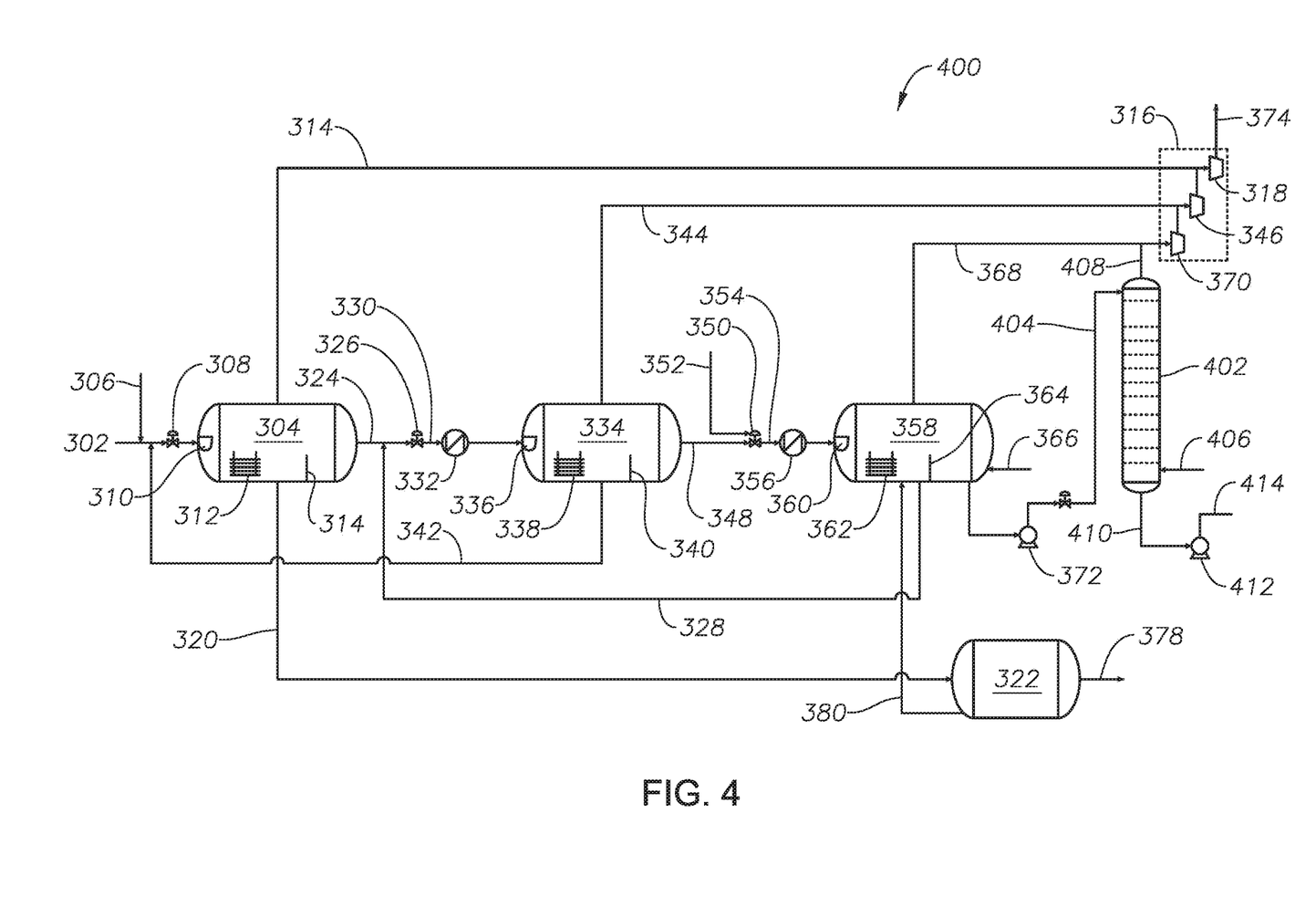
FIG. 4 is a schematic diagram showing an integrated GOSP of the present disclosure used for processing sour crude oil, including cold stabilization (in other words stabilization with no reboilers) using stripping gas along with or alternative to steam.

Referring now to FIG. 4, a schematic diagram is provided showing an integrated GOSP of the present disclosure used for processing sour crude oil, including cold stabilization using stripping gas along with or alternative to steam. Similarly labeled components represent components described previously in this specification.

For processing sour crude oil in embodiments of the present disclosure, a cold stabilizer 402 (stabilizer without reboilers) with about 16 actual stages can be used to reach an $H_2S$ content of about 10 ppm. A substantially dry and desalted crude oil inlet stream 404 proceeds into cold stabilizer 402 to be sweetened and stabilized as necessary with stripping gas stream 406. Stripping gas stream 406 can include any suitable gas with a low concentration of $H_2S$, in addition to or alternative to steam. Suitable stripping gases include steam, methane, ethane, nitrogen, and other suitable gases low in $H_2S$ concentration relative to the crude oil.

$H_2S$ gas and other volatile components (low molecular weight hydrocarbons) exit cold stabilizer 402 by atmospheric gas stream 408 to gas compression plant 316 and atmospheric compressor 370. Dry, desalted, stabilized, and sweetened crude oil exits cold stabilizer 402 by outlet stream 410 and is pumped by crude shipping pump 412 to transport stream 414. Notably, the embodiment of FIG. 4 does not contain any dehydrators or desalters, which are present in the embodiment of FIG. 2, and integrated systems and methods of the present disclosure operate in the absence of separate dehydrator and desalter units to produce dry, desalted, sweetened, and stabilized crude, which meets shipping and transport specifications recited here.

Figure 5:
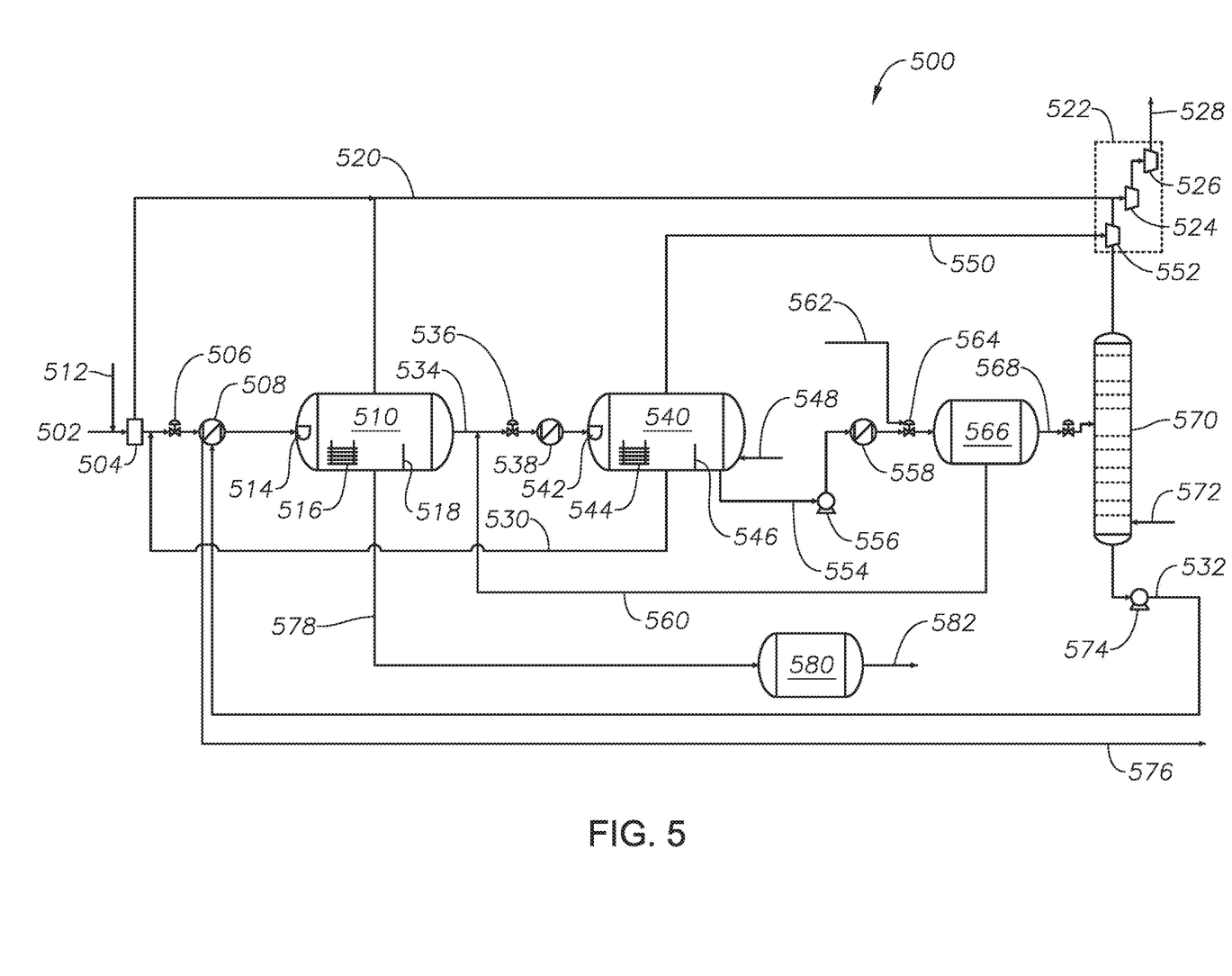
FIG. 5 is a schematic diagram showing an integrated GOSP of the present disclosure used for processing sour crude oil, including cold stabilization using stripping gas along with or alternative to steam and one desalter.

FIG. 5 is a schematic diagram showing an integrated GOSP of the present disclosure used for processing sour crude, including cold stabilization using stripping gas along with or alternative to steam and one desalter. In the integrated GOSP system 500, a sour, low pressure crude oil inlet feed 502 proceeds through an inline gas separator 504, a mixing valve 506, and a first heat exchanger 508 before entering a LPPT 510. A demulsifier injection port 512 is in fluid communication with low pressure crude oil inlet feed 502, and LPPT 510 further includes a cyclonic separator 514, insulated electrostatic electrodes 516, and a weir 518. A low pressure gas stream 520 proceeds from inline gas separator 504 and LPPT 510 to a gas compression plant 522 and a low pressure compressor 524. After low pressure compressor 524, gas passes through a high pressure compressor 526 and out through a gas exit stream 528 out of gas compression plant 522. Demulsifiers can be added, as necessary in other locations, rather than or in addition to the inlet, in embodiments of the present disclosure.

In mixing valve 506, low pressure crude oil inlet feed 502 is mixed with recycle water stream 530. In first heat exchanger 508, mixed crude oil and recycle water is heated by dry, desalted, stabilized, and sweetened crude stream 532 before entering cyclonic separator 514 and LPPT 510. After LPPT 510, a partially dried crude oil stream 534 proceeds through a mixing valve 536, a second heat exchanger 538 and into a LPDT 540. In mixing valve 536, partially dried crude oil stream 534 is mixed with recycled water stream 560. In second heat exchanger 538, mixed recycled water and partially dried crude oil are heated.

LPDT 540 includes a cyclonic separator 542, insulated electrostatic electrodes 544, a weir 546, and a stripping gas stream 548, which can include any stripping gas low in $H_2S$ concentration relative to the crude oil, in addition to or alternative to steam. Recycle water stream 530 exits at the bottom of LPDT 540, while an atmospheric gas stream 550 exits proximate the top of LPDT 540 and proceeds to an atmospheric compressor 552 in gas compression plant 522 before exiting via gas exit stream 528.

A partially dried and degassed crude oil stream 554 proceeds from LPDT 540 to a crude oil charge pump 556 and then to a third heat exchanger 558. After third heat exchanger 558, fresh water is injected via fresh water inlet 562 at a mixing valve 564 before entering a second stage desalter 566. Water is recycled from second stage desalter 566 via recycled water stream 560 to mixing valve 536, and a dried, desalted crude oil stream 568 proceeds to a cold stabilizer 570. A stripping gas stream 572 is in fluid communication with cold stabilizer 570, and optionally provides stripping steam in addition to or alternative to stripping gas low in $H_2S$ concentration relative to the crude oil. Atmospheric gas from cold stabilizer 570 proceeds to gas compression plant 522, and a crude shipping pump 574 pumps dry, desalted, stabilized, and sweetened crude stream 532 to first heat exchanger 508. Cold, dry crude oil for shipment proceeds by stream 576. Oily water stream 578 exits LPPT 510 and proceeds to an oil/water separator 580 before exiting via steam 582 for treated water disposal.

Notably, in the embodiment of FIG. 5, for sour and low pressure crude from production wells, one conventional desalter, second stage desalter 566, and one cold stabilizer, cold stabilizer 570, with about 16 actual stages can be used to meet an $H_2S$ concentration of about 1 ppm.

Figure 6:
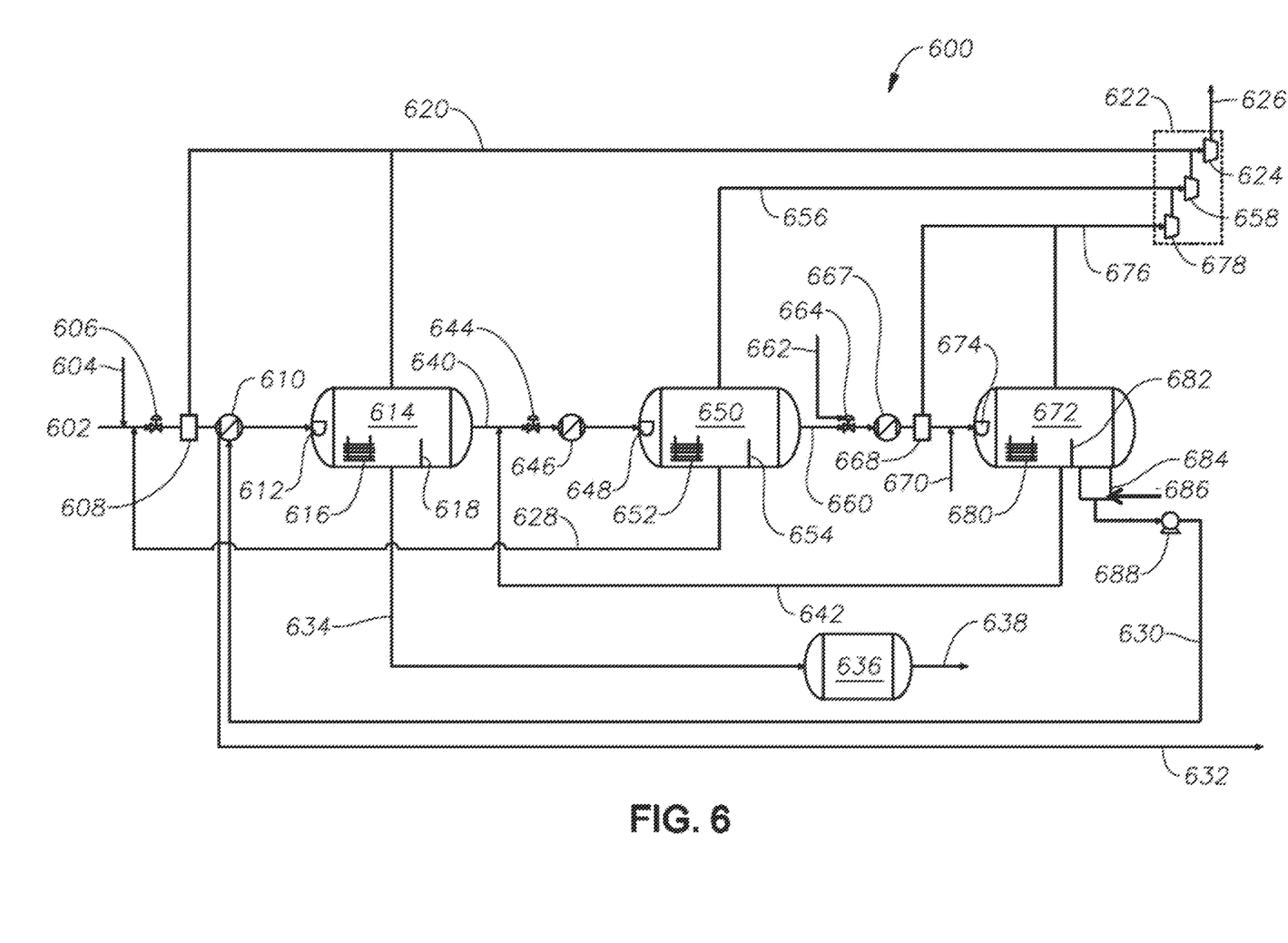
FIG. 6 is a schematic diagram showing an integrated GOSP of the present disclosure using additional separation stages and inline gas separators.

Referring now to FIG. 6, a schematic diagram is provided showing an integrated GOSP of the present disclosure using additional separation stages and inline gas separators. In integrated GOSP system 600, a crude oil inlet feed stream 602, in fluid communication with a demulsifier injection port 604, passes through a mixing valve 606, an inline gas separator 608, a first heat exchanger 610, and a cyclonic separator 612 on route to an HPPT 614. HPPT 614 includes insulated electrostatic electrodes 616 and a weir 618 to aid in the separation of water from oil. High pressure off-gas from inline gas separator 608 and HPPT 614 travels by high pressure off-gas stream 620 to a gas compression plant 622 and a high pressure compressor 624 to eventually exit integrated GOSP system 600 by a gas exit stream 626.

Inline gas separators include compact gas/liquid separators that apply cyclonic separation techniques to generate high gravitational forces ("G-Forces") with a low pressure drop to achieve high separation performance of gas from liquid in a pipe spool. Inline separators can be considered as one equilibrium separation stage, and produce very high quality separate gas and liquid streams.

Recycled water from recycled water stream 628 is mixed with crude oil inlet feed stream 602 in mixing valve 606, and mixed crude oil and water is heated in first heat exchanger 610 at least in part by heat from dry, desalted, sweetened, and stabilized crude oil product stream 630. Cooled dry, desalted, sweetened, and stabilized crude oil product stream 632 flows away from first heat exchanger 610 for shipment. Oily water from HPPT 614 proceeds by oily water stream 634 to oil/water separator 636 for treatment, and treated water is disposed of by stream 638. Separated oil from oil/water separator 636 can be recycled for further treatment (not shown).

Partially dried crude oil stream 640 from HPPT 614 is mixed with recycled water from recycled water stream 642 in mixing valve 644 and is heated in second heat exchanger 646. The heated mixed crude oil and recycled water then passes through a cyclonic separator 648 into a LPPT 650 for further drying. LPPT 650 includes insulated electrostatic electrodes 652 and a weir 654. Water from LPPT 650 is recycled via recycled water stream 628, and low pressure off-gas from LPPT 650 proceeds via stream 656 to gas compression plant 622 and a low pressure compressor 658.

Partially dry crude stream 660 exiting LPPT 650 comprises partially dry crude oil and is mixed with fresh water from a fresh water inlet stream 662 in mixing valve 664 before being heated in a third heat exchanger 667. Mixed crude oil and fresh water then passes to inline gas separator 668. Crude oil from the inline gas separator 668 is combined with a stripping gas stream 670 comprising steam in addition to or alternative to any other suitable stripping gas low in $H_2S$ concentration relative to the crude oil, and then the crude oil proceeds through a cyclonic separator 674 to LPDT 672. Atmospheric off-gas from inline gas separator 668 and LPDT 672 passes by way of atmospheric off-gas stream 676 to atmospheric compressor 678 to eventually exit integrated GOSP system 600 by way of gas exit stream 626. LPDT 672 further includes insulated electrostatic electrodes 680 and a weir 682.

Partially dried, desalted, sweetened, and stabilized crude from LPDT 672 proceeds to supplementary separation unit 684, which comprises a supplementary stripping gas stream 686 comprising steam in addition to or alternative to any other suitable stripping gas low in $H_2S$ concentration relative to the crude oil. Crude shipping pump 688 pumps finalized dry, desalted, sweetened, and stabilized crude by stabilized crude oil product stream 630 to first heat exchanger 610. Cooled dry, desalted, sweetened, and stabilized crude oil product stream 632 flows away from first heat exchanger 610 for shipment.

Although the disclosure has been described with respect to certain features, it should be understood that the features and embodiments of the features can be combined with other features and embodiments of those features.

Although the disclosure has been described in detail, it should be understood that various changes, substitutions, and alterations can be made hereupon without departing from the principle and scope of the disclosure. Accordingly, the scope of the present disclosure should be determined by the following claims and their appropriate legal equivalents.

The singular forms "a," "an," and "the" include plural referents, unless the context clearly dictates otherwise.

As used throughout the disclosure and in the appended claims, the words "comprise," "has," and "include" and all grammatical variations thereof are each intended to have an open, non-limiting meaning that does not exclude additional elements or steps.

As used throughout the disclosure, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present disclosure.

While the disclosure has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present disclosure may suitably comprise, consist or consist essentially of the elements disclosed and may be practiced in the absence of an element not disclosed.

What is claimed is:
1. An integrated gas oil separation method, the method comprising the steps of:
 heating crude oil, the crude oil comprising sour and low pressure crude oil;

separating, under low pressure, a low pressure off-gas and water from the crude oil, where separation is aided by electrostatic coalescence to produce partially dry crude oil;

heating the partially dry crude oil separated from the water and low pressure off-gas;

separating, under atmospheric pressure, an atmospheric off-gas and water from the partially dry crude oil to produce further partially dry crude oil, where separation is aided by electrostatic coalescence;

recycling the water separated, under atmospheric pressure, to mix with the crude oil before the step of separating, under low pressure;

heating the further partially dry crude oil;

mixing the further partially dry crude oil with fresh wash water;

desalting the further partially dry crude oil to produce recycle salt water and desalted, dry crude oil;

recycling the recycle salt water to mix with the partially dry crude oil before the step of separating, under atmospheric pressure;

stabilizing the desalted, dry crude oil to remove volatile hydrocarbons from the crude oil;

sweetening the desalted, dry crude oil to reduce $H_2S$ content in the desalted, dry crude oil; and producing a dehydrated, desalted, stable, and sweetened crude oil product safe for storage and transport.

2. The method according to claim 1, where the step of sweetening the desalted, dry crude oil comprises applying a stripping gas stream to reduce the $H_2S$ content of the crude oil, the stripping gas stream comprising gas at a lower $H_2S$ concentration than the crude oil.

3. The method according to claim 2, further comprising the step of collecting low pressure off-gas and atmospheric off-gas for treatment and processing.

4. The method according to claim 3, further comprising the steps of separating oil from water in an oily water output stream, and recycling oil from the oily water output stream for further processing.

5. The method according to claim 1, where the method is operable to refine sour and low pressure crude oil to produce a refined crude oil product safe for storage and shipment meeting the following specifications: (1) a salt concentration of not more than about 10 pound (lbs) of salt/1000 barrels (PTB); (2) basic sediment and water (BSW) of not more than about 0.3 volume percent (V %); (3) $H_2S$ concentration of less than about 60 ppm; and (4) a maximum RVP of about 7 pounds per square inch absolute (psia) and a maximum true vapor pressure (TVP) of about 13.5 psia at 130 degrees Fahrenheit (° F.).

6. The method according to claim 2, further comprising the step of applying a second stripping gas stream to reduce the $H_2S$ content of the crude oil, the second stripping gas stream comprising gas at a lower $H_2S$ concentration than the crude oil.

7. The method according to claim 1, where the step of separating, under low pressure, low pressure off-gas and water from crude oil, where separation is aided by electrostatic coalescence, is operable to remove about 98% of emulsified water present in the crude oil.

8. The method according to claim 1, where the method is operable to dehydrate, desalt, sweeten, and stabilize crude oil to produce crude oil safe for storage and shipment without any dehydrating or desalting units other than a low pressure production trap, a low pressure degassing tank, a desalter unit, and a cold stabilizer.

9. The method according to claim 1, where at least a portion of the heat provided for heating crude oil arises from the dehydrated, desalted, stable, and sweetened crude oil product.

\* \* \* \* \*